Figure 1:
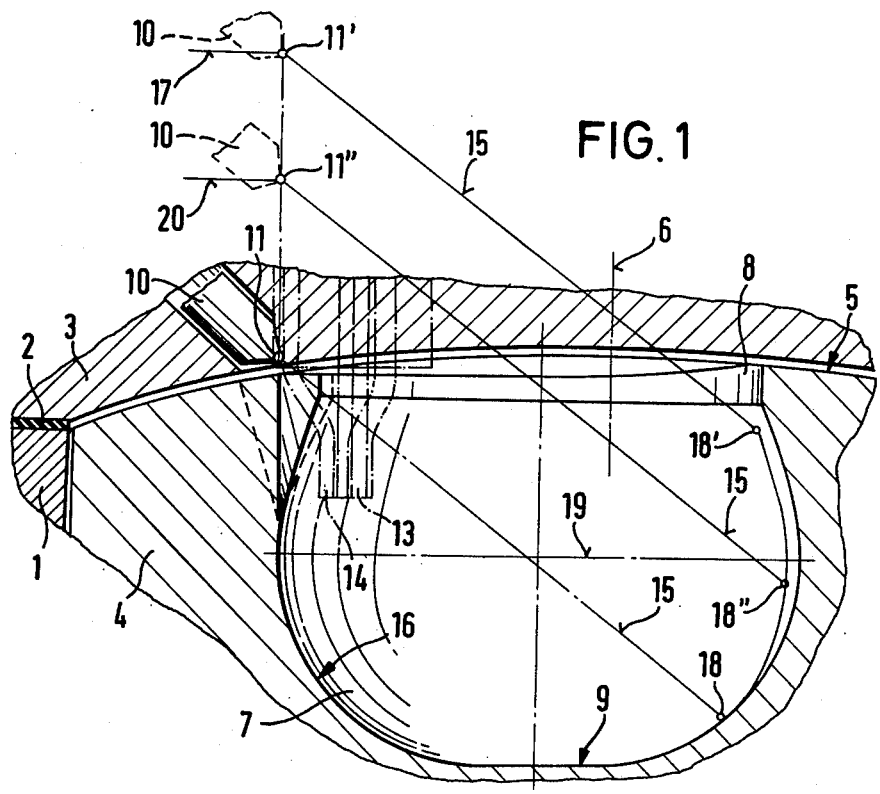

United States Patent [19]

Urlaub et al.

[11] 4,278,057
[45] Jul. 14, 1981

[54] METHOD OF BURNING APPLIED-IGNITION FUELS IN AN AIR-COMPRESSING DIRECT-INJECTION INTERNAL COMBUSTION ENGINE

[75] Inventors: Alfred Urlaub; Franz Chmela, both of Nürnberg, Fed. Rep. of Germany

[73] Assignee: Maschinenfabrik Augsburg-Nürnberg Aktiengesellschaft, Nürnberg, Fed. Rep. of Germany

[21] Appl. No.: 969,673

[22] Filed: Dec. 15, 1978

[30] Foreign Application Priority Data

Dec. 15, 1977 [DE] Fed. Rep. of Germany ....... 2755916

[51] Int. Cl.$^3$ ............................................. F02B 3/04
[52] U.S. Cl. ..................................... 123/276; 123/260
[58] Field of Search ................ 123/30 C, 30 D, 32 A, 123/32 B, 32 C, 32 SP, 32 ST, 32 SA, 32 D

[56] References Cited

U.S. PATENT DOCUMENTS

| | | | |
|---|---|---|---|
| 2,762,347 | 9/1956 | Seegelken | 123/30 D |
| 2,995,121 | 8/1961 | Meurer | 123/30 D |
| 3,094,974 | 6/1963 | Barber | 123/30 C |
| 3,469,564 | 9/1969 | Hiereth | 123/32 A |
| 3,534,714 | 10/1970 | Urlaub | 123/32 SA |
| 3,641,986 | 2/1972 | Fricker et al. | 123/30 C |
| 3,828,739 | 8/1974 | Finsterwalder | 123/32 SP |
| 3,999,532 | 12/1976 | Kornhauser | 123/32 SP |

*Primary Examiner*—Ronald H. Lazarus
*Assistant Examiner*—Andrew M. Dolinar
*Attorney, Agent, or Firm*—Becker & Becker, Inc.

[57] ABSTRACT

A method of burning fuels ignited by applied-ignition in an air-compressing direct injection internal combustion engine according to which the fuel is, preferably in the form of a jet, sprayed onto the wall of the combustion chamber having the shape of a body of revolution with the major portion of the fuel being deposited in the form of a film to be gradually removed in the form of vapors by and mixed with the air admitted and performing a rotary motion. An ignition device provided at the upper dead center position of the piston projects into the combustion chamber in the vicinity of the injection nozzle opening arranged near the combustion chamber edge between the free fuel jet penetrating the combustion chamber on the one hand and the combustion chamber wall on the other hand. The pressure level in the high pressure section of the injection system and thus the rate of fuel injection into the cylinder is selected to lie between 0.7 and 1.3 per degree of crank angle times liter stroke volume. Furthermore, the fuel injection is so extended that the fuel impingement point at the start of the injection is just still at the upper end of the combustion chamber wall and in the upper dead center position of the piston lies near the lower end of the combustion chamber wall near the combustion chamber bottom with the fuel film extending nearly over the entire depth of the combustion chamber on the combustion chamber wall.

4 Claims, 2 Drawing Figures

METHOD OF BURNING APPLIED-IGNITION FUELS IN AN AIR-COMPRESSING DIRECT-INJECTION INTERNAL COMBUSTION ENGINE

This invention relates to a method of burning applied-ignition fuels in an air-compressing direct injection internal combustion engine according to which the fuel is preferably applied with a jet causing a major proportion of the fuel to be injected and deposited as a film on the wall of the combustion chamber provided in the shape of a body of revolution in the piston crown. This film is removed gradually in the form of vapor detached from the wall of the combustion chamber by the incoming air which performs a rotary motion and gradually intermixes with the vapor. There is furthermore provided an ignition device which at the top dead center position of the piston projects into the combustion chamber at a point near the injection nozzle hole disposed at the combustion chamber rim between the free fuel jet penetrating through the combustion chamber and the combustion chamber wall.

Air-compressing, direct injection, internal combustion engines utilizing the process of wall deposition of the fuel are generally known today. Furthermore, it is known, for instance, from the disclosure in the German Pat. 1 576 020 corresponding to U.S. Pat. No. 3,534,714-Urlaub issued Oct. 20, 1970 belonging to the assignee of the present invention, to equip such internal combustion engines with an ignition device such as a spark plug or glow plug, and, in particular during starting from cold or for the purpose of multi-fuel operation, to operate them with applied-ignition. For this purpose it has also been proposed to have the ignition device project into the combustion chamber at a point near the injection nozzle hole between the free fuel jet penetrating the combustion chamber and the combustion chamber wall, thereby obtaining a reliable ignition and efficient mixture preparation and combustion.

When using applied-ignition fuels, such as gasoline, it has been found that engine performance, in particular fuel consumption, exhaust gas temperature and smoke emission could still be improved.

This is the starting point of the present invention which has for its object to improve an internal combustion engine of the above mentioned type in a simple manner and at reduced cost so that the thermal mixture-formation process governing the combustion pattern, when burning applied-ignition fuels, will be correlated to the respective prevailing conditions so that the disadvantages referred to are avoided.

Figure 2:
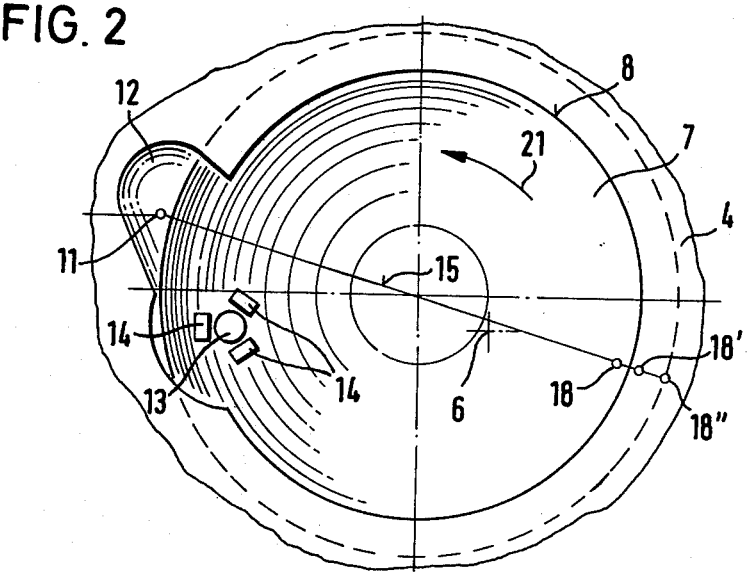

This object and other objects and advantages of the invention will appear more clearly from the following specification in connection with the accompanying drawing, in which:

FIG. 1 is a longitudinal section through the upper part of a piston having a combustion chamber in the shape of a body of revolution indicating schematically the fuel injection according to the invention at various positions of the piston; and FIG. 2 is a plan view of the piston shown in FIG. 1.

The method according to the invention is characterized primarily by lowering the pressure level in the high pressure part of the injection system and thereby the rate of injection into the cylinder, over combustion of self-ignition fuels, by 40 to 60%, preferably by 50% and by extending the fuel injection process so that the point of fuel impingement at the beginning of the injection cycle is just at the upper end of the combustion chamber wall and, in the top dead center position of the piston, near the lower end thereof or close to the combustion chamber bottom. Furthermore, the fuel film is spread by the rotary motion of the air substantially over the full depth of the combustion chamber and the combustion chamber wall.

In other words, the injection time, which in the case of such engines on an average is between 30° crank angle ahead of top dead center and the top dead center at full load, is extended by advancing the start of injection, and the rate of injection which generally is of the order of 2 $(mm^3)/(°CA \times lsv)$ is reduced, and respectively the injection pressure is correspondingly lowered. In the above fraction °CA stands for the degree of crank angle, and lsv stands for liter stroke volume. Simultaneously provision is made for the fuel film to spread substantially over the entire depth of the combustion chamber. This has a positive effect on the thermal mixture formation governing the combustion pattern.

Aside from the fact that this enables a simpler, low cost and lighter injection pump design to be used, there is also obtained a reduction in the noise level in the injection system. However, with regard to the solution of the problem involved, it is of great importance that engine performance is significantly improved as a result of the more favorable thermal mixture formation process in the application described. For instance, numerous tests have proved that the specific fuel consumption can be reduced by up to 10%, while the exhaust gas temperature is approximately 20% lower and the smoke emission drops by about 30%.

The extended retention phase of the fuel on the combustion chamber wall as a result of the invention does by no means change the pattern of the subsequent ignition process so that an excessive amount of combustible mixture would exist which obviously would result in an undesirable increase in the rate of pressure rise because, on the one hand, the fuel removal from the combustion chamber wall is accelerated only by the heat of the flame and, consequently, contributes little to the formation of a combustible mixture prior to ignition and, on the other hand, by far the greater amount of combustible mixture is formed in the conventional manner by fuel particles separating and evaporating out of the free fuel jet.

The amount of combustible fuel-air mixture forming in the manner described above is not excessive in spite of the considerably extended injection phase, because, on the one hand, fuel injection starts at a time when disintegration of the fuel jet is still low because of the relatively low air density and, on the other hand, jet disintegration is generally lower because of the lower pressures in the fuel lines and, consequently, also the injection rate is lower than with the conventional injection methods.

More specifically, it is proposed according to the present invention that the fuel injection process be started between 50° and 60°, preferably at 54° crank angle ahead of top dead center position of the piston and that the free fuel jet traverses the combustion chamber in such a manner that the points of impingement which, as a result of the motion of the piston, are along a line on the combustion chamber wall substantially diametrically opposite the injection nozzle hole.

Referring now to the drawing in detail, FIG. 1 schematically indicates a cylinder 1 which, at its top end, is covered by a cylinder head 3 also shown schematically, with a gasket 2 interposed between the cylinder head 3 and the cylinder 1. In the cylinder 1 there is shown a piston 4 in its top center position which has a combustion chamber 7 in the shape of a body of revolution, and a restricted throat 8 and a flat bottom 9 in its crown 5, said combustion chamber 7 being for instance offset against the center line 6 of the cylinder 1.

Disposed obliquely in the cylinder head 3 there is an injector 10 arranged so that its injection nozzle hole 11 is situated substantially in the plane of the lower edge of the cylinder head 3 and at the edge of the combustion chamber throat 8 or, respectively, in a recess 12 (FIG. 2). An ignition device consisting of electrodes 13, 14 is also secured in the cylinder head 3 near the injection nozzle hole 11. At the top dead center position of the piston 4, these electrodes 13, 14 which are arranged parallel to each other project into the combustion chamber 7 between a free fuel jet 15 penetrating through the combustion chamber 7 and the combustion chamber wall 16 as can be seen from FIG. 2. The electrodes 13, 14 are shown by dot-dash lines in FIG. 1 because they actually project into the front half of the combustion chamber 7.

Referring finally to FIG. 2, it will be seen that the ignition device consists of a central electrode 13 and three individual electrodes 14 connected with each other whereby reliability of ignition is improved.

To understand the invention, one should visualize the lower edge of the cylinder head 3 and, consequently, the injection nozzle hole 11' being situated in the plane 17 so that the piston 4 is still approximately 54° crank angle away from its top dead center position. At this instant, fuel injection already starts with the fuel jet 15 being oriented so that its point of impingement 18' is just at the upper end of the combustion chamber wall 16 without fuel particles reaching the piston crown 5.

When the piston 4 moves further upwards and with the illustrated embodiment is approximately 40° crank angle ahead of the top dead center, the point of impingement 18' of the fuel jet 15 moves on the combustion chamber wall 16 downwards and, at 18", is already below the equator 19. The injection nozzle hole 11" in this position is in a plane 20 away from the piston 4.

In the top dead center position of the piston 4, the injection nozzle hole 11 is located directly above the combustion chamber 7, whereas the point of impingement 18 of the fuel jet has reached a point near the combustion chamber bottom 9. The fuel which in this way is applied along a line over substantially the full depth of the combustion chamber 7 on its wall 16 is swept along by the air of combustion which rotates in the direction of the arrow 21 to form a wide film which eventually is gradually removed by the air in the form of vapor, is mixed with the air, and finally is burned after ignition.

It is, of course, to be understood that the present invention is by no means, limited to the specific method described in connection with the accompanying drawing but also comprises any modifications within the scope of the appended claims.

What we claim is:

1. A method of burning fuels ignited by applied-ignition in an air compressing direct injection internal combustion engine having a piston having a stroke volume with an upper dead center position and having a combustion chamber formed in said piston shaped in the form of a body of revolution including a wall and an edge as well as an upper end and a depth, which includes the steps of: starting a fuel injection cycle and spraying a free fuel current in a stream length directly onto a portion of the wall of said combustion chamber from a point substantially diametrically opposite thereof with the major portion of the fuel deposited on the combustion chamber wall in the form of a film, admitting air into said combustion chamber while imparting thereto a rotary movement to cause the air gradually to detach said film in the form of vapor from the combustion chamber wall and to intermix said air with said vapor, beginning the ignition near the combustion chamber edge at a location downstream in the direction of the rotary movement of said air where the free fuel current begins to traverse the combustion chamber and upstream in the direction of the rotary movement of said air where the fuel current impinges against the combustion chamber wall, selecting a fuel pressure level of the fuel current injection so that the rate of fuel injection into the cylinder lies between 0.7 and 1.3 cubic millimeters per degree angle times liter stroke volume and the fuel impingement point at the starting of the fuel injection cycle is substantially even with the upper end of the combustion chamber wall, and in the upper dead center position of the piston the fuel impingement point lies near the lower end of the combustion chamber wall near the combustion chamber bottom with the fuel impingement point traversing nearly the entire depth of the combustion chamber on the combustion chamber wall.

2. A method according to claim 1, which includes the steps of starting the fuel injection cycle between 50° and 60° crank angle ahead of the upper dead center position of the piston.

3. A method according to claim 2, which includes the step of starting the fuel injection cycle at 54° crank angle adhead of the upper dead center position of the piston.

4. A method according to claim 3, which includes the step of causing the fuel current to traverse the combustion chamber in such a manner that points of fuel current impingement caused by the piston movement lie linearly aligned on the combustion chamber wall and are located substantially opposite the location where said starting of the injection into the combustion chamber occurs.

* * * * *